(12) United States Patent
Barkana

(10) Patent No.: US 8,006,007 B1
(45) Date of Patent: Aug. 23, 2011

(54) TIME SCALE NORMALIZATION OF A DIGITIZED SIGNAL

(75) Inventor: Tamer Barkana, Shelton, CT (US)

(73) Assignee: BICOM, Inc., Monroe, CT (US)

( * ) Notice: Subject to any disclaimer, the term of this patent is extended or adjusted under 35 U.S.C. 154(b) by 289 days.

(21) Appl. No.: 12/348,080

(22) Filed: Jan. 2, 2009

(51) Int. Cl.
*G06F 3/00* (2006.01)
*H03M 1/00* (2006.01)

(52) U.S. Cl. .............. 710/52; 710/29; 710/36; 710/60; 341/122

(58) Field of Classification Search .................. None
See application file for complete search history.

(56) References Cited

U.S. PATENT DOCUMENTS

| 7,158,480 B1 * | 1/2007 | Firoiu et al. | 370/235 |
| 2010/0098047 A1 * | 4/2010 | Zhou et al. | 370/345 |

\* cited by examiner

*Primary Examiner* — Alan Chen
(74) *Attorney, Agent, or Firm* — Ohlandt, Greeley, Ruggiero & Perle, L.L.P.

(57) ABSTRACT

There is provided a method that includes (a) inputting data to a buffer, wherein the inputting increases a quantity of the data in the buffer, (b) processing the data from the buffer, wherein the processing decreases a quantity of the data in the buffer, (c) determining an average quantity of the data in the buffer, and (d) converting a data stream for inputting to the buffer, from a first quantity of samples to a second quantity of samples, if the average quantity is outside of a target range.

21 Claims, 7 Drawing Sheets

TIME SCALE NORMALIZATION OF A DIGITIZED SIGNAL

BACKGROUND OF THE INVENTION

1. Field of the Invention

The present disclosure relates to processing data that is transmitted by a transmitter that utilizes a first clock, and received by a receiver that utilizes a second clock. The process described herein is particularly well-suited for employment in an audio system that involves a distribution of digitized audio signals over a local area network (LAN) to speakers that are distributed in different physical locations. Such a LAN may be implemented, for example, as an Ethernet-based LAN using CAT-5 and/or CAT-6 cable, or any other packet based distribution medium, wired or wireless.

2. Description of the Related Art

In currently available packet-based distribution systems, similar issues are addressed using hardware technologies such as a voltage-controlled oscillator (VCO) or long data buffers. However, such technologies increase the cost of the electronics required to achieve satisfactory results.

Although the VCO solution may permit individual channels to be synchronized within a couple of milliseconds, buffered solutions cannot achieve this precision, and eventually, synchronization loss could occur between channels.

There are also carrier-based, e.g., radio frequency, synchronization signals in use, but these also require more costly and complex VCO circuits to be implemented.

Furthermore these techniques may introduce considerable unpredictable jitter due to employment of phase locked loop (PLL) circuits, causing degradation of audio quality.

SUMMARY OF THE INVENTION

It is an object of the present disclosure to provide high-quality audio distribution to multiple speakers located in different physical locations while maintaining synchronization of relevant audio signals that are destined to appropriately located speakers, such as right-channel signal to a speaker located on the right or left-channel signal to a speaker located on the left.

It is another object of the present disclosure to distribute the same signal to speakers located in various physical locations without losing synchronization between the speakers, such that each speaker plays exactly the same audio signal within an inaudible time tolerance, such that no echo-like effect is heard from any location.

It is yet another object of the present disclosure to use a standard high-speed packet based link to transport digital audio signal while maintaining the synchronization between individual channels.

It is a further object of the present disclosure to provide for controlled operations if the link is lost and to reestablish the synchronization automatically when the link is restored.

It is a still further object of the present disclosure to provide a speaker platform that operates free of the constraints of a long data buffer or a VCO.

It is a still further object of the disclosure to provide a standard interface across the link while sustaining the synchronization between channels.

The present disclosure provides a method that includes (a) inputting data to a buffer, wherein the inputting increases a quantity of the data in the buffer, (b) processing the data from the buffer, wherein the processing decreases a quantity of the data in the buffer, (c) determining an average quantity of the data in the buffer, and (d) converting a data stream for inputting to the buffer, from a first quantity of samples to a second quantity of samples, if the average quantity is outside of a target range.

The present disclosure also provides for (a) an apparatus that includes a buffer, and circuitry that performs the method, and (b) a storage medium comprising instructions that are readable by a processor, for controlling the processor to perform the method.

An exemplary implementation of the apparatus is described as an integral part of a speaker system.

DESCRIPTION OF THE INVENTION

Figure 1:
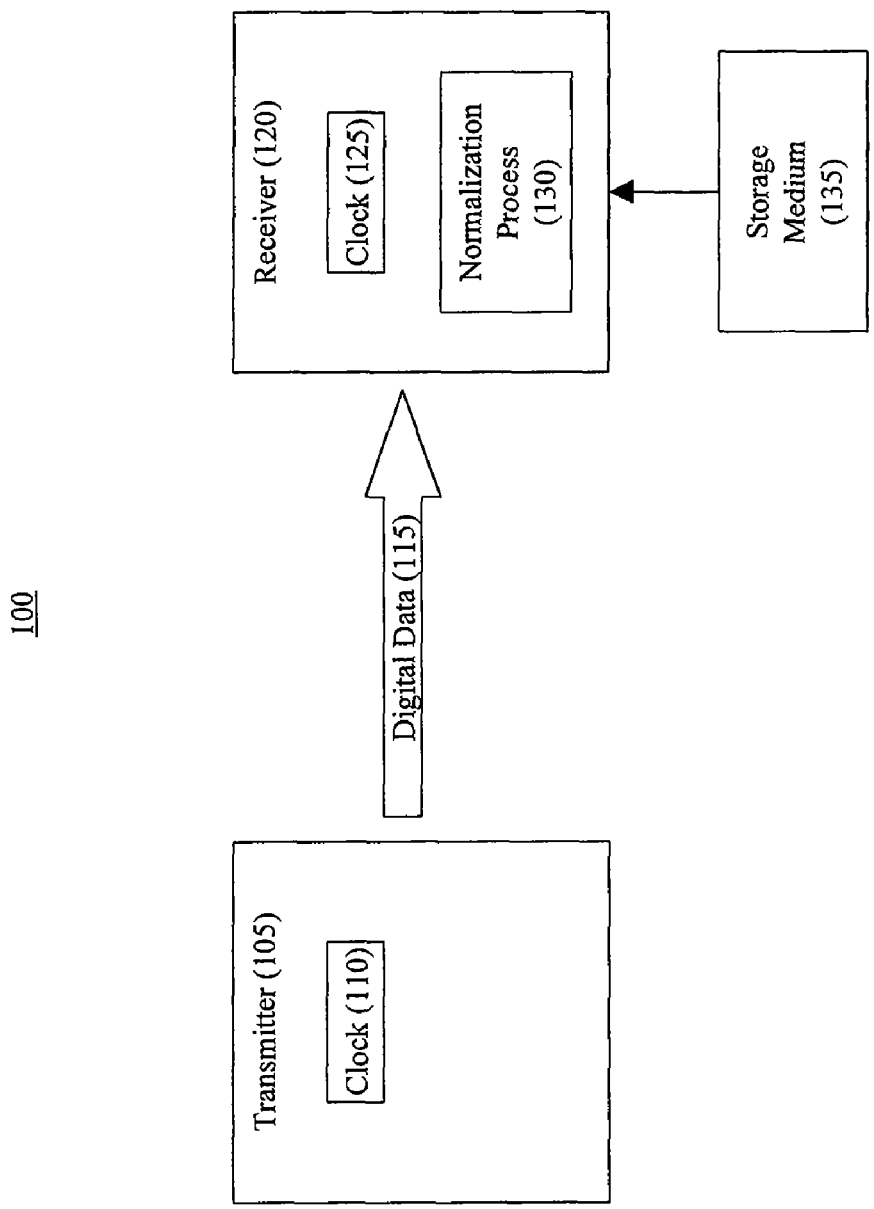
FIG. 1 is a block diagram of a system that employs a normalization process to accommodate data being transmitted by a transmitter that utilizes a first clock, and being received by a receiver that utilizes a second clock.

FIG. 1 is a block diagram of a system 100 that employs a normalization process 130 to accommodate digital data 115 being transmitted by a transmitter 105 that utilizes a first clock, i.e., clock 110, and being received by a receiver 120 that utilizes a second clock, i.e., clock 125.

Figure 2:
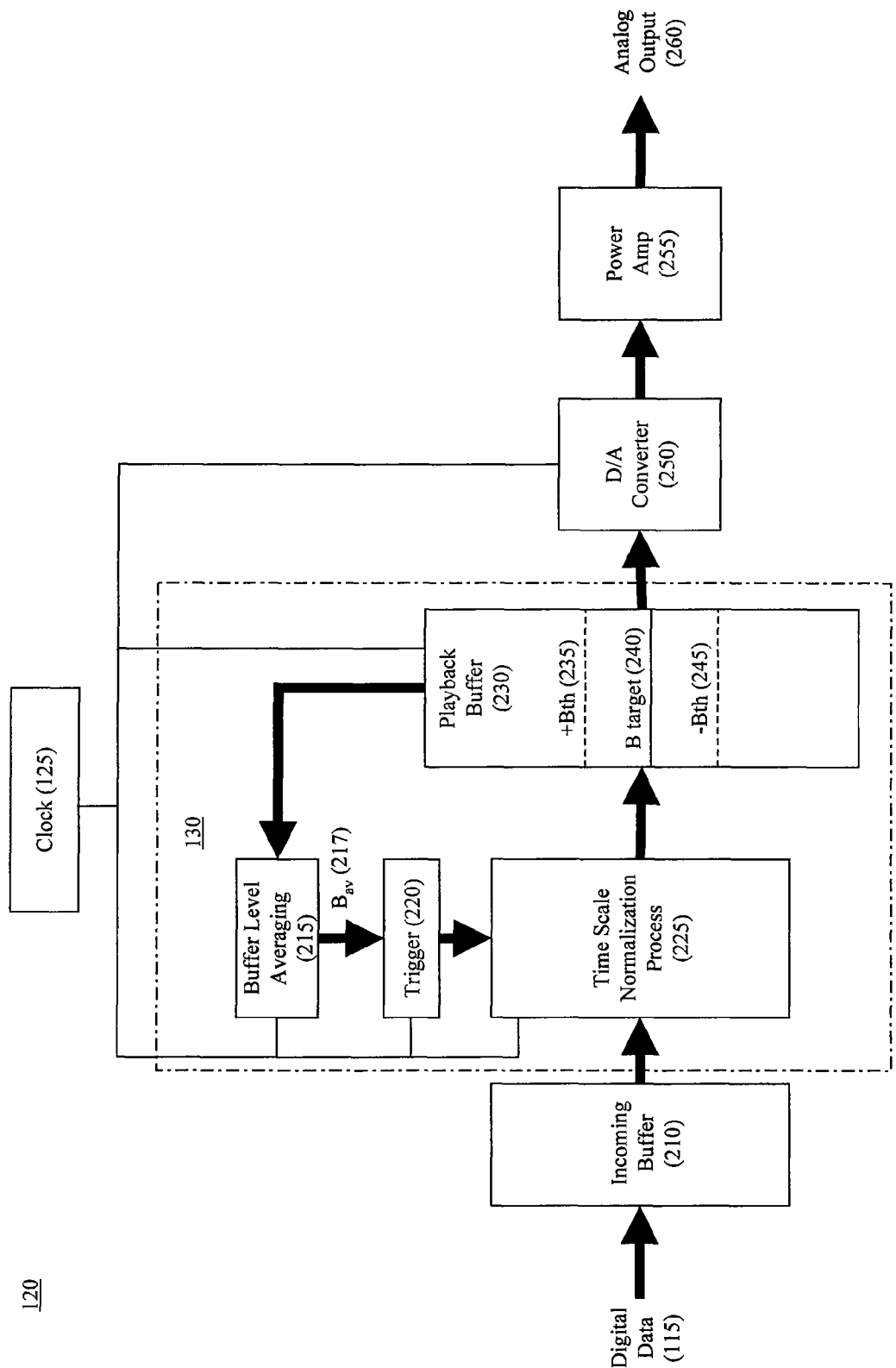
FIG. 2 is a block diagram of the receiver of FIG. 1.

FIG. 2 is a block diagram of receiver 120. As noted above, receiver 120 includes clock 125 and normalization process 130. Receiver 120 also includes an incoming buffer 210, a digital-to-analog (D/A) converter 250, and a power amp 255.

Incoming buffer 210 receives and buffers digital data 115. Incoming buffer 210 may be implemented with any device suitable for buffering generic digital data. By way of non-limiting example, incoming buffer 210 can be a circuit such as a random access memory (RAM).

Normalization process 130 includes a time scale normalization process 225, a playback buffer 230, a buffer level averaging 215, and a trigger 220, each of which is driven by clock 125. Time scale normalization process 225 reads data from incoming buffer 210, and writes, i.e., inputs, the data into playback buffer 230. Under certain circumstances, as described below, time scale normalization process 225 will modify the data before the data is written into playback buffer 230.

D/A converter 250 reads, i.e., processes, data from playback buffer 230, and performs a digital to analog conversion, thus producing an analog signal.

Power amp 255 receives the analog signal from D/A converter 250, amplifies the analog signal, and provides an analog output 260.

Receiver 120 is described herein as being employed in an audio system wherein digital data 115 includes a digitized audio stream. However, receiver 120 is not limited to employment in an audio system, but may also be used, for example, in systems such as voice over Internet protocol (VOIP), digital radio, satellite communications, cellular telephone. Also, digital data 115 is not limited to providing digitized audio data, but can be any data stream, e.g., video. Indeed digital data 115 may include any type of digitized data. In like fashion, analog output 260 is not limited to audio output, and may be in a form of, for example, voice output, video output, or a combination thereof.

As mentioned above, normalization process 130 inputs the data into playback buffer 230, and D/A converter 250 processes data from playback buffer 230. The inputting increases the quantity of the data in playback buffer 230, and the processing decreases the quantity of data in playback buffer 230. If the rate at which the data is input into playback buffer 230 is greater than the rate at which the data is processed, and if nothing is done to account for the difference in rates, playback buffer 230 would eventually overflow. Similarly, if the rate at which the data is input into playback buffer 230 is less than the rate at which the data is processed, and if nothing is done to account for the difference in rates, playback buffer 230 would eventually underflow, i.e., be emptied.

Referring back briefly to FIG. 1, note that digital data 115 is provided from transmitter 105 at a rate determined by clock 110. As such, if clock 125 is slower than clock 110, the rate at which data is input to playback buffer 230 would be greater than the rate at which the data is processed, and consequently, playback buffer 230 would tend to overflow. If clock 125 is faster than clock 110, the rate at which data is input to playback buffer 230 would be less than the rate at which the data is processed, and consequently, playback buffer 230 would tend to underflow. The overflow or underflow can occur whenever clock 110 and clock 125 are not identical to one another. That is, even a relatively minor difference in clock rate, e.g., a difference of less than 1%, can lead to an overflow or an underflow.

In a situation where analog output 260 represents an audio output, either of the overflow or the underflow of playback buffer 230 would be undesirable. In the case of the overflow, playback buffer 230 would not be able to accommodate all of the data that is presented to it, and so, portions of the intended analog output 260 would be missing. In the case of the underflow, there would be periods of time during which playback buffer 230 would contain no data, and as such, analog output 260 would include unintended periods of silence. In order to avoid the overflow or underflow of playback buffer 230, normalization process 130 strives to maintain the quantity of data in playback buffer 230 so that the quantity is, on average, at about some target value, i.e., B target 240, and more particularly in a target range between an upper threshold level, i.e., +Bth 235, and a lower threshold level, i.e., −Bth 245.

Buffer level averaging 215 monitors the quantity of data in playback buffer 230, and provides an output Bay 217 indicative of an average quantity over some period of time.

Trigger 220 receives Bay 217 and determines whether Bay 217 is within a target range between −Bth 245 and +Bth 235. Trigger 220 provides an output that indicates whether the quantity is below the target range, within the target range, or above the target range.

Time scale normalization process 225, as mentioned above, reads data from incoming buffer 210, and inputs the data into playback buffer 230, but under certain circumstances will modify the data before inputting it into playback buffer 230. Time scale normalization process 225 also receives the output from trigger 220. If Bay 217 is within the target range, i.e., between −Bth 245 and +Bth 235, then time scale normalization process 225 does not modify the data. However, if Bay 217 is outside the target range, time scale normalization process 225 converts a data stream from incoming buffer 210, from a first quantity of samples to a second quantity of samples, and inputs the second quantity of samples into playback buffer 230. More specifically, if trigger 220 indicates that Bay 217 is below the target range, time scale normalization process 225 modifies the data stream to increase the quantity of samples in the data stream. If trigger 220 indicates that Bay 217 is above the target range, time scale normalization process 225 modifies the data stream to decrease the quantity of samples in the data stream.

Consider the case where trigger 220 indicates that Bay 217 is below the target range. Bay 217 being below the target range indicates that the rate at which data is being input into playback buffer 230 is less than the rate at which the data is being processed. Accordingly, time scale normalization process 225 modifies the data stream to increase the quantity of samples in the data stream, thus having a tendency to increase the average quantity of data in playback buffer 230.

Consider the case where trigger 220 indicates that Bay 217 is above the target range. Bay 217 being above the target range indicates that the rate at which data is being input into playback buffer 230 is greater than the rate at which the data is being processed. Accordingly, time scale normalization process 225 modifies the data stream to decrease the quantity of samples in the data stream, thus having a tendency to decrease the average quantity of data in playback buffer 230.

Figure 3:
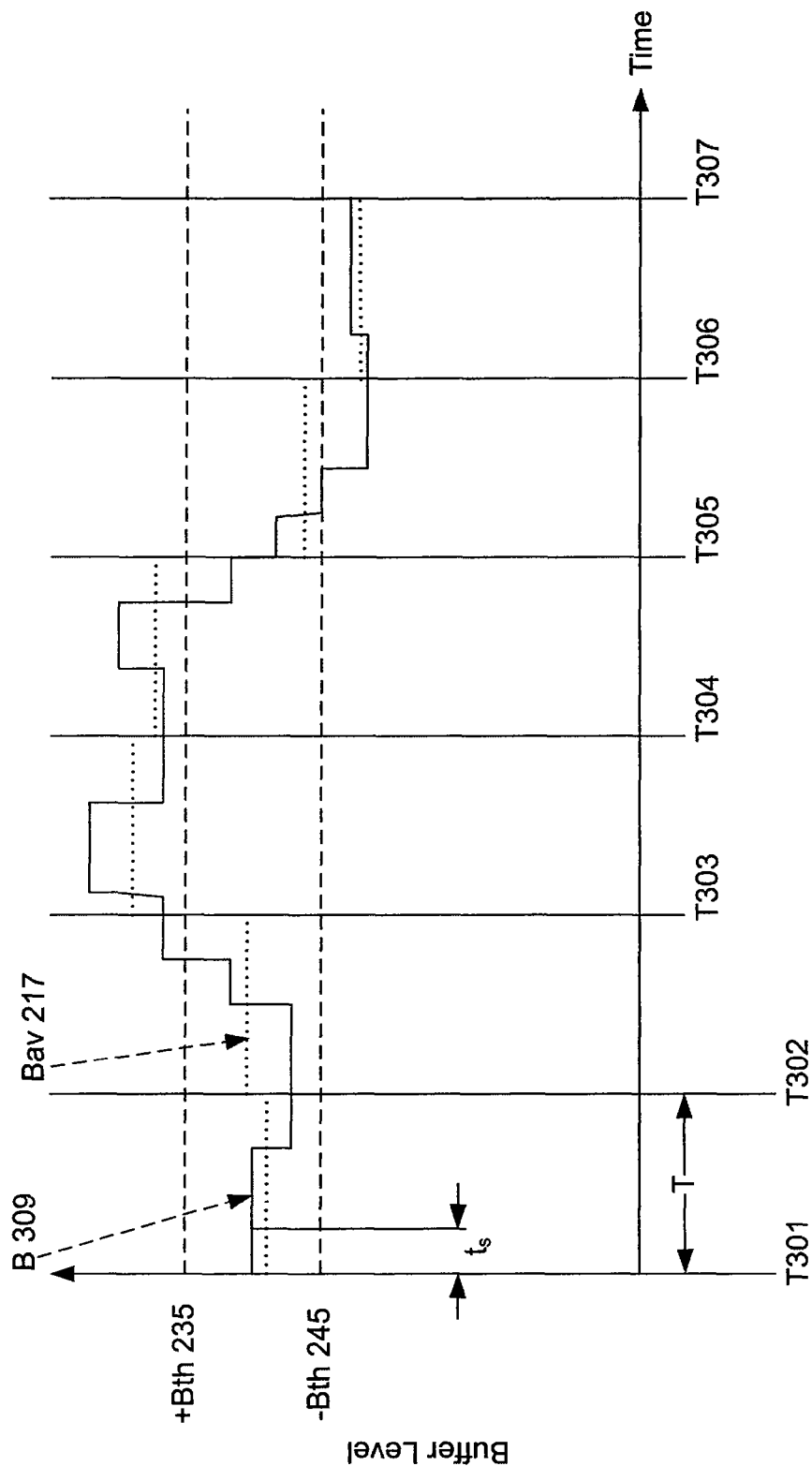
FIG. 3 is a graph showing levels of data in a buffer.

FIG. 3 is a graph showing levels of data, i.e., data level B 309, in playback buffer 230 during a hypothetical operation of receiver 120 over a period of time having timepoints T301-T307. FIG. 3 also shows values for Bay 217, designated with a dotted line. Data level B 309 and Bay 217 meander over time, but due to the operation of normalization process 130, are brought back within the range between +Bth 235 and −Bth 245.

Buffer level averaging 215 averages the quantity of data in playback buffer 230 over a time period T, thus yielding Bay 217, which is calculated by sampling data level B 309 every $t_s$ seconds.

During the interval between T301 and T302, and the interval between T302 and T303, Bay 217 is within the target range, i.e., between −Bth 245 and +Bth 235. As such, time scale normalization process 225 will not modify the data stream.

During the interval between T303 and T304, and the interval between T304 and T305, Bay 217 exceeds +Bth 235. Accordingly, time scale normalization process 225 will act to decrease the quantity of samples in the data stream, thus having a tendency to decrease the average quantity of data in playback buffer 230.

During the interval between T305 and T306, Bay 217 is within the target range, i.e., between −Bth 245 and +Bth 235. As such, time scale normalization process 225 will not modify the data stream.

During the interval between T306 and T307, Bay 217 falls below −Bth 245. Accordingly, time scale normalization process 225 will act to increase the quantity of samples in the data stream, thus having a tendency to increase the average quantity of data in playback buffer 230.

Time scale normalization process 225 modifies the data stream by processes of upsampling and downsampling. More specifically, time scale normalization process 225 upsamples the data stream from incoming buffer 210 by an upsampling factor to produce an interim data stream, and downsamples the interim data stream by a downsampling factor to produce a resultant data stream.

By upsampling, time scale normalization process 225 creates from incoming buffer 210 a much higher quantity of samples than the quantity of samples provided in the data stream. The purpose of this upsampling is to create interim samples that, although not received in digital data 115, nevertheless represent the actual analog signal as if such signal were sampled at much higher rate.

The resultant data stream from time scale normalization process 225 is inputted to playback buffer 230. Based on a relationship between the upsampling factor and the downsampling factor, the quantity of samples in the resultant data stream will be either greater than or less than the quantity of samples in the data stream from incoming buffer 210. For example, if the upsampling factor is greater than the downsampling factor, the quantity of samples in the resultant data stream will be greater than the quantity of samples in the data stream from incoming buffer 210. If the upsampling factor is less than the downsampling factor, the quantity of samples in the resultant data stream will be less than the quantity of samples in the data stream from incoming buffer 210.

If desired, normalization process 130 can be employed to accommodate clock 110 and clock 125 having vastly different frequencies. However, the combined acts of upsampling and downsampling are particularly well-suited for a situation in which clock 110 and clock 125 are only slightly different from one another, e.g., less than 1%. This is because, in part, the upsampling factor and the downsampling factor can be chosen, or set, to accommodate such a situation.

The data stream is a digital representation of an analog input signal that was sampled at a sampling rate. D/A converter 250 converts the data stream to an analog signal at a conversion rate. Ideally, the conversion rate will be the same as the sampling rate. However, if the sampling rate is a function of clock 110 and the conversion rate is a function of clock 125, and clocks 110 and 125 are not identical to one another, a signal that is intended to represent a tone of a particular frequency, e.g., 1000 Hz, when converted, may appear at a different frequency, e.g., 1001 Hz, thus introducing a form of frequency distortion. This potential for frequency distortion is particularly troublesome in a system having a plurality of channels because each of the channels may produce a slightly different frequency. However, if each of the channels includes a receiver 120, normalization process 130 reduces the opportunity for such frequency distortion, and is particularly well-suited for a situation in which the conversion rate is within 1% of the sampling rate.

Figure 4:
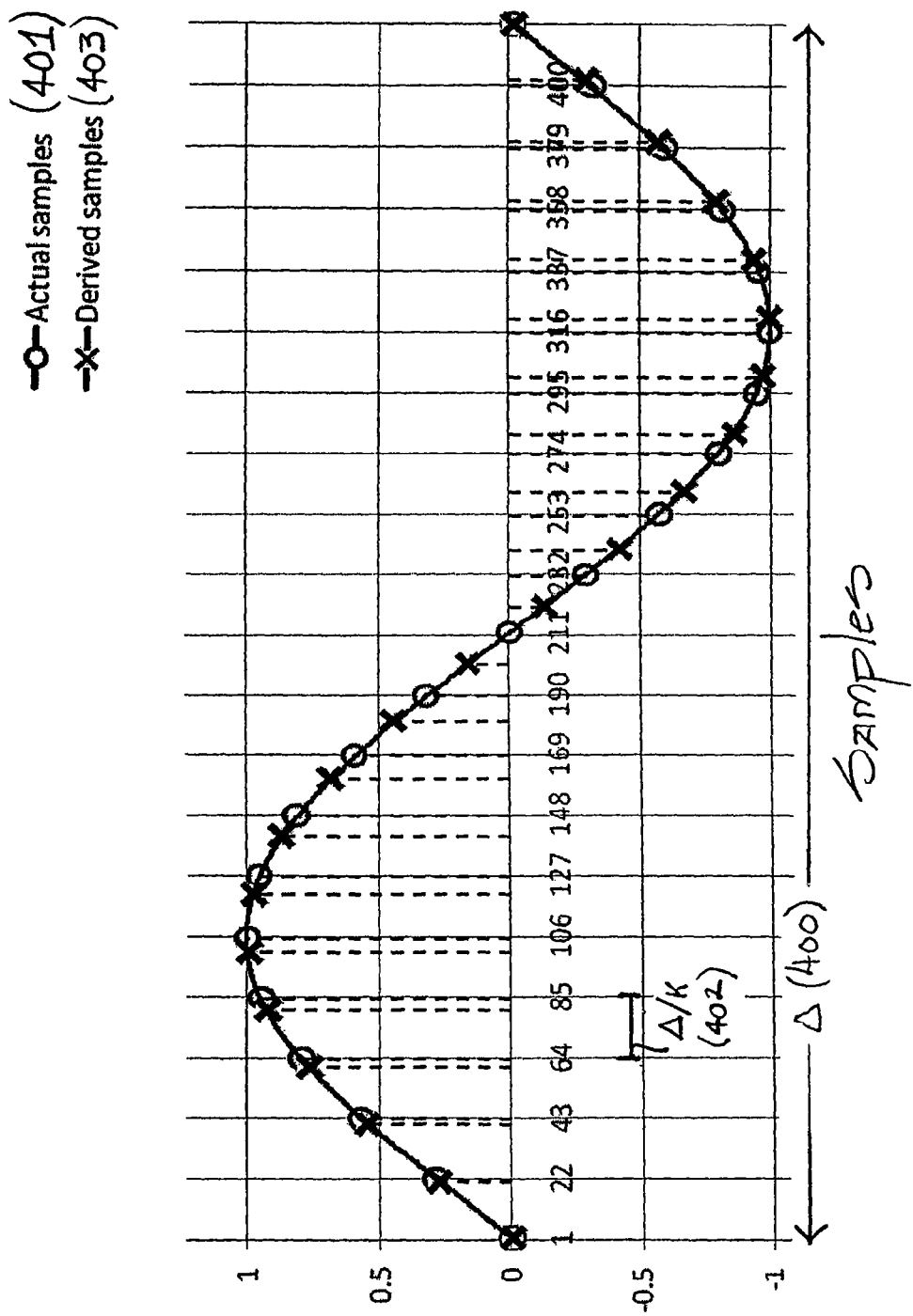
FIG. 4 is a graph of a signal being normalized, in a case where a receiver clock is faster than a transmitter clock.

FIG. 4 is a graph of a signal being normalized, in a case where clock 125 is faster than clock 110. Since clock 125 is faster than clock 110, Bay 217 will tend to fall below −Bth 245. Accordingly, time scale normalization process 225 will convert the data stream from incoming buffer 210 having a first quantity of samples, into a resultant data stream having a second, greater, quantity of samples, thus tending to increase Bay 217.

For example, referring to FIG. 4, assume a sampling rate of $k/\Delta$, where k is a number of samples and $\Delta$ is a period of time. Thus, $\Delta/k$ 402 represents a period of time between two actual samples. If there are twenty one actual samples 401, depicted as O's in FIG. 4, during time $\Delta$ 400, time scale normalization process 225 will produce twenty two derived samples, depicted as X's in FIG. 4. The motivation for this is to make sure, due to clock drift, a sample does not represent the real amplitude for the sample location, as it drifted slightly to a new location due to the frequency of clock 125. However, if time scale normalization process 225 creates enough samples from the original signal, instead of playing all twenty one samples with an error in their positions, receiver 120 plays somewhat more samples, which can be derived from the actual samples using a digital interpolation filter. To ensure that the derived samples represent the actual analog signal amplitude and to avoid introducing a major error or distortion, time scale normalization process 225 includes calculated sample amplitudes at a much higher sampling rate, thus yielding an error that is less than any chosen arbitrary number. To ensure that the twenty two derived samples 403 and the twenty one actual samples 401 that are received represent the exact same audio signal, time scale normalization process 225 generates 20×21=420 samples using the twenty one actual samples 401 and a digital interpolation filter. As a result, time scale normalization process 225 produces four hundred twenty high resolution samples that represent the actual waveform amplitudes as if the original signal amplitude was sampled at twenty one times higher rate clock. Since the clock rate originally was above the Nyquist rate, increasing this rate further does not harm the signal integrity. Since each and every sample represents the actual analog waveform amplitude within a defined margin of error, which can be made infinitesimally small by using an appropriate mathematical interpolation method, time scale normalization process 225 picks each 20th sample instead of each 21st sample and sends them to playback buffer 230, from which they are subsequently read by D/A converter 250. By increasing the number of samples without distorting the signal, time scale normalization process 225 allows the level of data in playback buffer 230 to increase above −Bth 245 as the incoming rate did not change.

Figure 5:
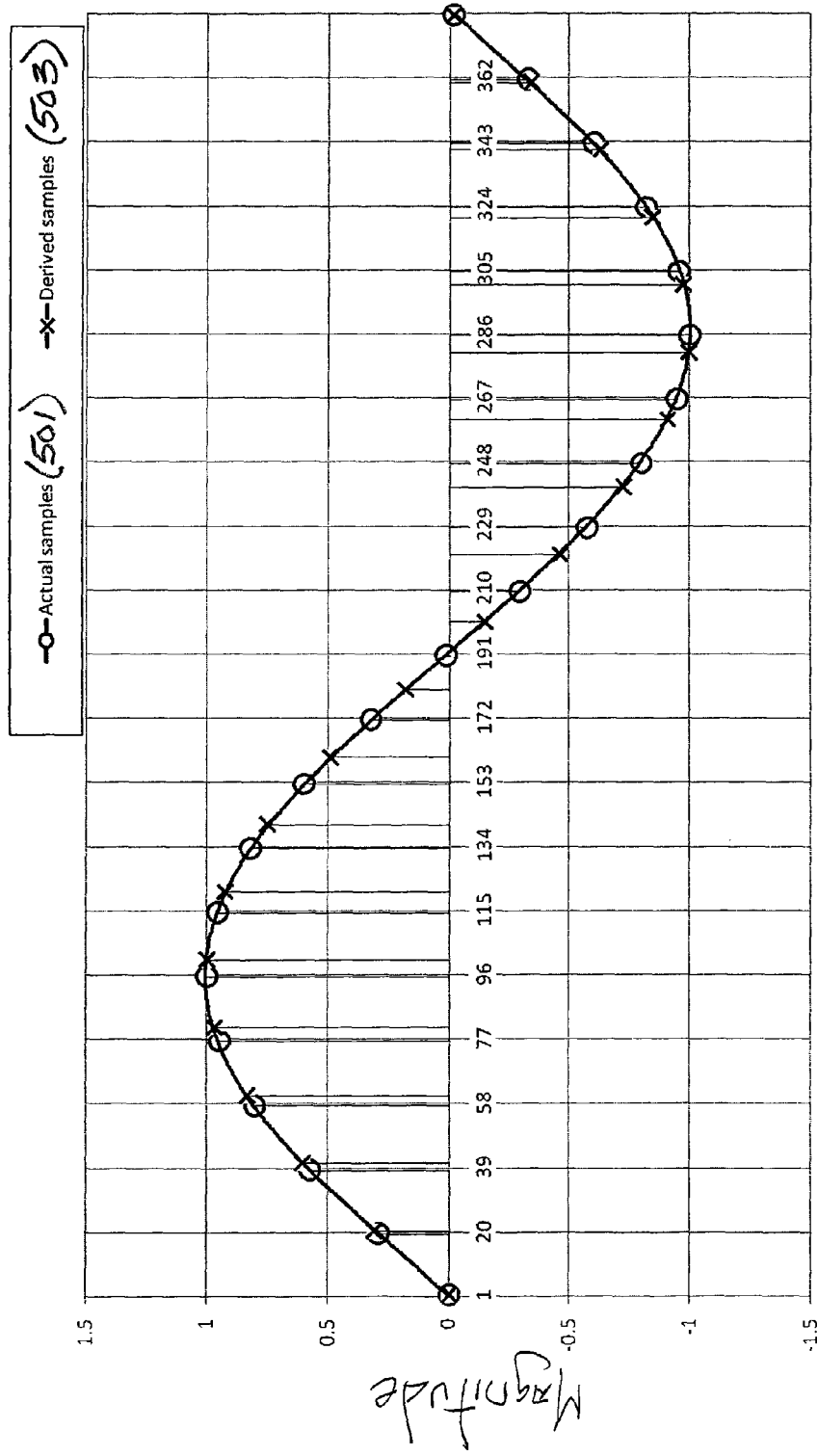
FIG. 5 is a graph of a signal being normalized, in a case where a receiver clock is slower than a transmitter clock.

FIG. 5 is a graph of a signal being normalized by time scale normalization process 225, in a case where clock 125 is slower than clock 110.

Since clock 125 is slower than clock 110, Bay 217 will tend to rise above +Bth 235. Accordingly, time scale normalization process 225 will convert the data stream from incoming buffer 210 having a first quantity of samples, into a resultant data stream having a second, lesser, quantity of samples, thus tending to decrease Bay 217.

For example, referring to FIG. 5, receiver 120 may need to play twenty derived samples 503 for twenty-one actual samples 501. To make sure that the derived samples 503 represent the actual analog signal amplitude, and to not introduce a major error or distortion, time scale normalization process 225 removes calculated sample amplitudes at a much higher sampling rate, to provide an error that is less than any chosen arbitrary number. To ensure that the twenty derived samples 503 and the twenty one actual samples 501 that are received represent the exact same audio signal as the original samples, time scale normalization process 225 generates 20×19=380 samples using the twenty one actual samples 501 and a digital interpolation filter. As a result, time scale normalization process 225 produces three hundred eighty high resolution samples that represent the actual waveform amplitudes as if the original signal amplitude was sampled at nineteen times higher rate clock. Since each and every sample represents the actual analog waveform amplitude within a defined margin of error, which can be made infinitesimally small by using an appropriate mathematical interpolation method, time scale normalization process 225 picks each 20th sample instead of each 19th sample, and sends them to playback buffer 230, from which they are subsequently read by D/A converter 250. By decreasing the number of samples without distorting the signal, time scale normalization process 225 allows the level of data in playback buffer 230 to decrease below +Bth 235 as the incoming rate did not change.

Normalization process 130 may be implemented in a configuration of one or more circuits, that is, a configuration of electrically or electromagnetically connected components or devices, in hardware, firmware, or a combination thereof. In the alternative, normalization process 130 may be implemented in a memory device (not shown) within receiver 120, having instructions stored therein that are readable by a processor (not shown), to control the processor to perform the actions of normalization process 130.

Also, although normalization process 130 may be implemented in a memory device within receiver 120, it could also be implemented on a storage medium 135 (see FIG. 1) for subsequent loading into the memory device of receiver 120. Storage medium 135 can be any conventional storage medium, including, but not limited to, a floppy disk, a compact disk, a magnetic tape, a read only memory, or an optical storage medium. Storage medium 135 could also be a random access memory, or other type of electronic storage, located on a remote storage system and coupled to the memory device of receiver 120.

Figure 6:
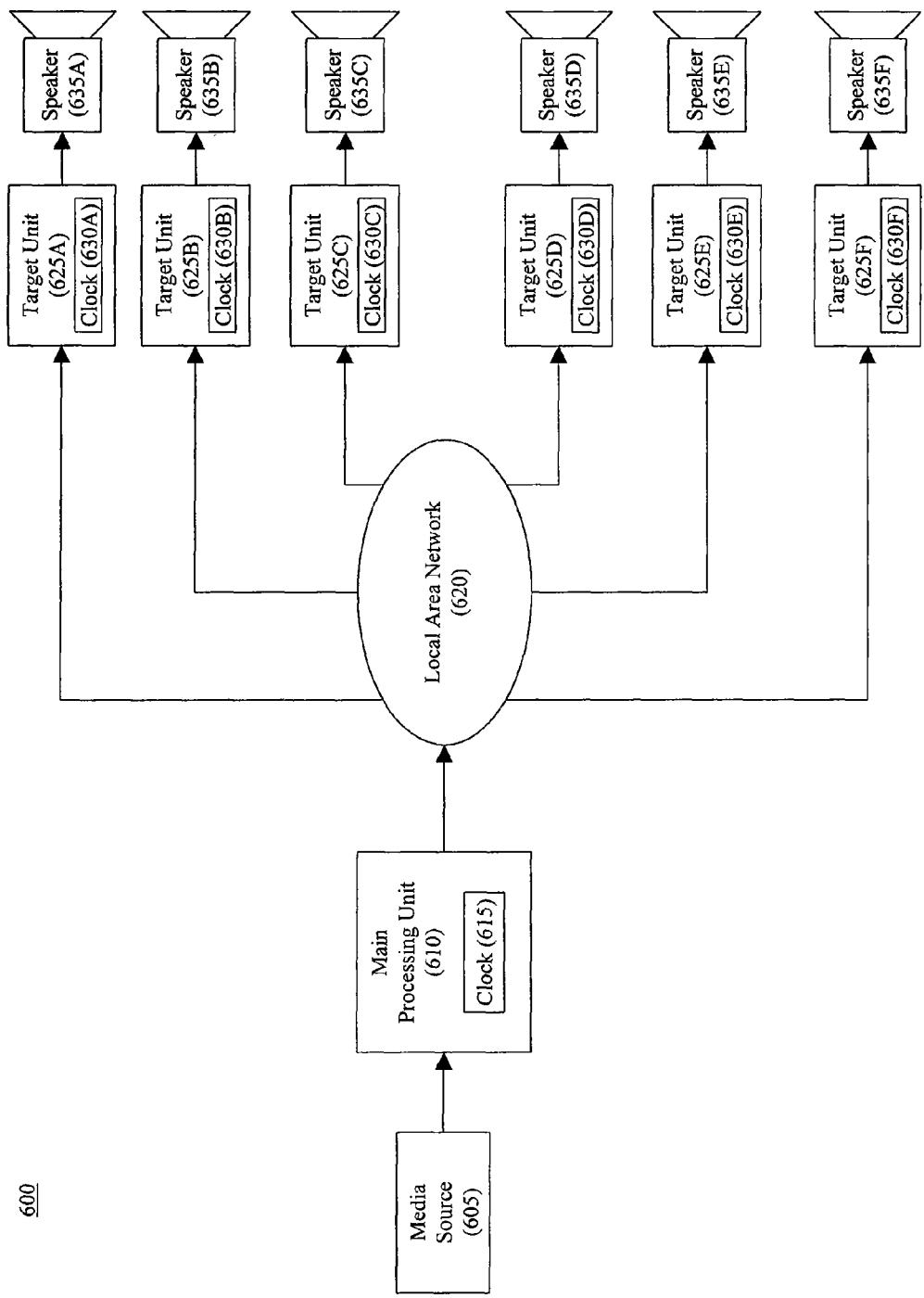
FIG. 6 is a block diagram of an audio system implemented over a network.

FIG. 6 is a block diagram of an audio system 600 implemented over a local area network 620. Audio system 600 includes a media source 605, a main processing unit 610, six target units 625A-625F, and six speakers 635A-635F. Speakers 635A-635F may be arranged, for example, in a configuration of two front speakers, two rear speakers, a front center speaker, and a sub-woofer. Although audio system 600 is shown with six target units, i.e., target units 625A-625F, and six speakers, i.e., speakers 635A-635F, audio system 600 can have as many target units and speakers as the bandwidth of the transmission medium permits.

Media source 605 is a source of data for audio system 600. It can be, by way of nonlimiting example, a CD player.

Main processing unit 610 receives the data from media source 605, processes it, and transmits, via local area network 620, a data packet containing a data stream, to each of target units 625A-625F. Main processing unit 610 is driven by a clock 615.

Each of target units 625A-625F includes a respective clock 630A-630F, and is in communication with a respective one of speakers 635A-635F.

All of clocks 615 and 630A-630F are usually intended to operate at the same frequency. However, in actuality, clocks 615 and 630A-630F will each have a slightly different frequency from any of the other clocks 615 and 630A-630F. Consequently, if nothing is done to compensate for the differences in frequencies, target units 625A-625F could lose synchronicity with main processing unit 610, or lose synchronicity with one another. The loss of synchronicity between target units 625A-625F could manifest itself as an echo-like effect if the time difference is in the order of milliseconds.

However, although not shown in FIG. 6, each of target units 625A-625F is configured similarly to receiver 120, and in particular, includes a respective normalization process 130. Therefore, each of target units 625A-625F will process their respective data packets in a manner that ensures that target units 625A-625F maintain synchronicity with main processing unit 610, and thus, maintain synchronicity with each other.

Figure 7:
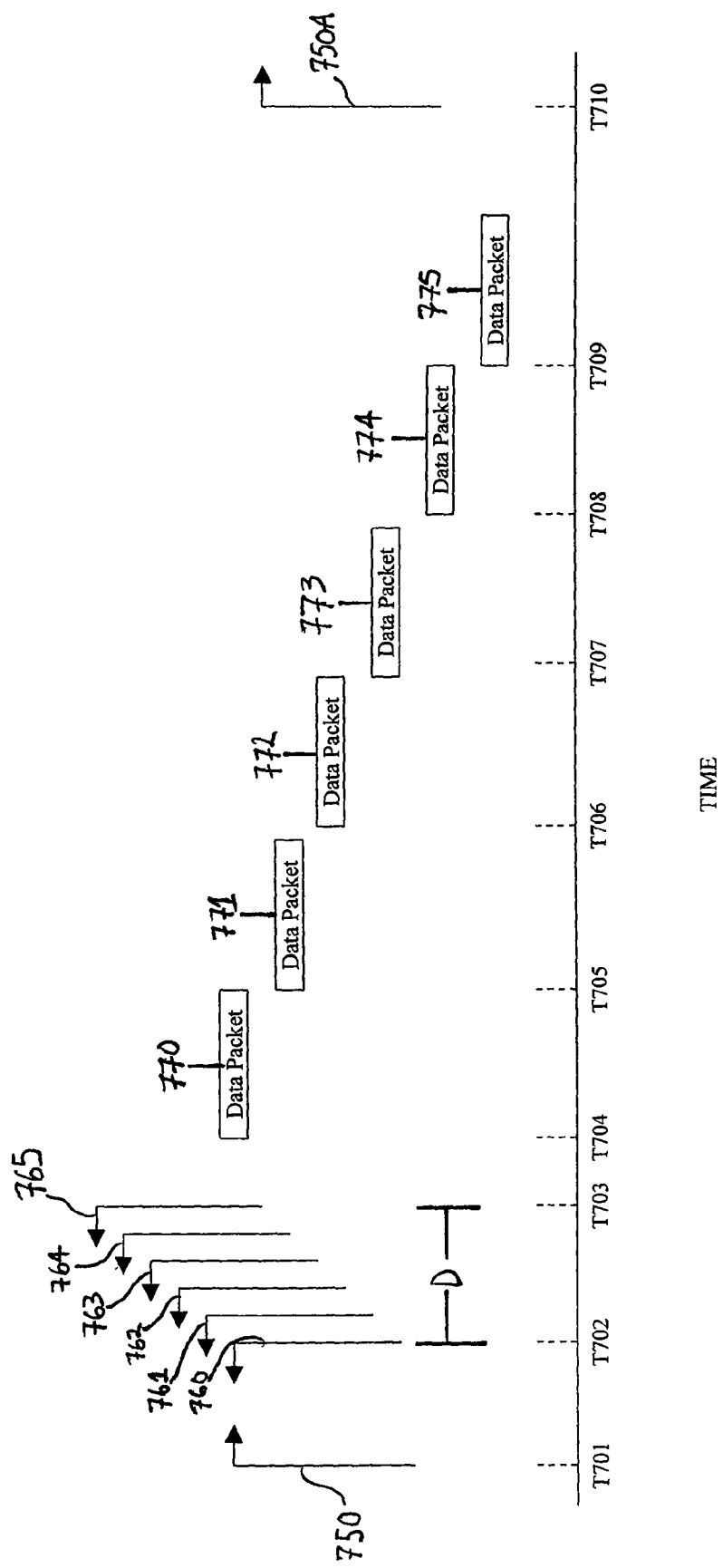
FIG. 7 is a diagram showing communication between components of the audio system of FIG. 6.

FIG. 7 is a diagram showing communication between components of audio system 600.

At time T701, main processing unit 610 broadcasts a beacon signal 750, which among other things serves as a delimiter of a beginning of a data transmission. Within a response time variance D, each of target units 625A-625F emits a respective response 760-765 that identifies target units 625A-625F to main processing unit 610.

After main processing unit 610 receives responses 760-765, main processing unit 610 transmits data packets 770-775 to target units 625A-625F, respectively. That is, data packet 770 is sent to target unit 625A, data packet 771 is sent to target unit 625B, and so on.

At time T710, main processing unit broadcasts a beacon signal 750A, that serves as a delimiter of an end of the data transmission.

Consider target unit 625A, and its operation as in receiver 120. The thresholds −Bth 245 and +Bth 235, and thus the target range, could be fixed by design. That is, by design, −Bth 245 can be set to a particular fixed value, and +Bth 235 can be set to another particular fixed value.

Alternatively, thresholds −Bth 245 and +Bth 235, and thus the target range, could be based on a quantity of data in data packet 770. More specifically, target unit 625A receives beacon 750, followed by data packet 770, and then by beacon 750A. Beacons 750 and 750A serve as delimiters around data packet 770. Target unit 625A can set the target range based on the quantity of data in data packet 770. For example, if data packet 770 contains 5 k bytes of data, target unit 625A will set −Bth 245 and +Bth 235 to values slightly below 5 k and slightly above 5 k. Also, since beacons 750 and 750A serve as delimiters, a plurality of data packets can be transmitted from main processing unit 610 to target unit 625A between beacons 750 and 750A, and the range can then be set based on the cumulative quantity of data in the plurality of data packets.

As another alternative, thresholds −Bth 245 and +Bth 235, and thus the target range, could be based on a communication from main processing unit 610 that indicates a target value and/or a target range for the quantity of data in playback buffer 230. For example, main processing unit 610 could include a target value in a header that accompanies beacon 750, or in a separate communication that is not part of a beacon. Target unit 625A would then set the target range based on the target value.

The techniques described herein are exemplary, and should not be construed as implying any particular limitation on the present disclosure. It should be understood that various alternatives, combinations and modifications could be devised by those skilled in the art. The present disclosure is intended to embrace all such alternatives, modifications and variances that fall within the scope of the appended claims. Also, steps associated with these processes described herein can be performed in any order, unless otherwise specified or dictated by the steps themselves.

The invention claimed is:

1. A method comprising:
    inputting data to a buffer, wherein said inputting increases a quantity of said data in said buffer;
    processing said data from said buffer, wherein said processing decreases a quantity of said data in said buffer;
    determining an average quantity of said data in said buffer; and
    converting a data stream for inputting to said buffer, from a first quantity of samples to a second quantity of samples, if said average quantity is outside of a target range,
    wherein said converting comprises:
        upsampling said first quantity of samples by an upsampling factor to produce an interim data stream; and
        downsampling said interim data stream by a downsampling factor to produce said second quantity of samples.

2. The method of claim 1,
    wherein said data stream is a digital representation of an analog input signal that was sampled at a sampling rate,
    wherein said processing comprises converting said data stream to an analog output signal at a conversion rate, and
    wherein said conversion rate is within 1% of said sampling rate.

3. The method of claim 1, further comprising:
receiving a communication that serves as first delimiter;
receiving a quantity of data in one or more data packets;
receiving a communication that serves as a second delimiter; and
setting said target range based on said quantity of data in said one or more data packets.

4. The method of claim 1, further comprising:
receiving a communication that includes information selected from the group consisting of (a) a target value for a quantity of data in said buffer, (b) a target range for a quantity of data in said buffer, and (c) a combination thereof; and
setting said target range based on said information.

5. The method of claim 1,
wherein said upsampling factor is greater than said downsampling factor if said average quantity is below said target range, and
wherein said upsampling factor is less than said downsampling factor if said average quantity is above said target range.

6. The method of claim 1,
wherein said data stream is a digital representation of an analog signal, and
wherein said converting converts said first quantity of samples to said second quantity of samples without distorting said analog signal.

7. The method of claim 1, wherein said buffer is a playback buffer in a receiver.

8. An apparatus comprising:
a buffer; and
circuitry that performs actions of:
inputting data to said buffer, wherein said inputting increases a quantity of said data in said buffer;
processing said data from said buffer, wherein said processing decreases a quantity of said data in said buffer;
determining an average quantity of said data in said buffer; and
converting a data stream for inputting to said buffer, from a first quantity of samples to a second quantity of samples, if said average quantity is outside of a target range,
wherein said converting comprises:
upsampling said first quantity of samples by an upsampling factor to produce an interim data stream; and
downsampling said interim data stream by a downsampling factor to produce said second quantity of samples.

9. The apparatus of claim 8,
wherein said data stream is a digital representation of an analog input signal that was sampled at a sampling rate,
wherein said processing comprises converting said data stream to an analog output signal at a conversion rate, and
wherein said conversion rate is within 1% of said sampling rate.

10. The apparatus of claim 8, wherein said circuitry also performs actions of:
receiving a communication that serves as first delimiter;
receiving a quantity of data in one or more data packets;
receiving a communication that serves as a second delimiter; and
setting said target range based on said quantity of data in said one or more data packets.

11. The apparatus of claim 8, wherein said circuitry also performs actions of:
receiving a communication that includes information selected from the group consisting of (a) a target value for a quantity of data in said buffer, (b) a target range for a quantity of data in said buffer, and (c) a combination thereof; and
setting said target range based on said information.

12. The apparatus of claim 8,
wherein said upsampling factor is greater than said downsampling factor if said average quantity is below said target range, and
wherein said upsampling factor is less than said downsampling factor if said average quantity is above said target range.

13. The apparatus of claim 8,
wherein said data stream is a digital representation of an analog signal, and
wherein said converting converts said first quantity of samples to said second quantity of samples without distorting said analog signal.

14. The apparatus of claim 8, wherein said buffer is a playback buffer in a receiver.

15. A storage medium comprising instructions that are readable by a processor and that control said processor to perform actions of:
inputting data to a buffer, wherein said inputting increases a quantity of said data in said buffer;
processing said data from said buffer, wherein said processing decreases a quantity of said data in said buffer;
determining an average quantity of said data in said buffer; and
converting a data stream for inputting to said buffer, from a first quantity of samples to a second quantity of samples, if said average quantity is outside of a target range,
wherein said converting comprises:
upsampling said first quantity of samples by an upsampling factor to produce an interim data stream; and
downsampling said interim data stream by a downsampling factor to produce said second quantity of samples.

16. The storage medium of claim 15,
wherein said data stream is a digital representation of an analog input signal that was sampled at a sampling rate,
wherein said processing comprises converting said data stream to an analog output signal at a conversion rate, and
wherein said conversion rate is within 1% of said sampling rate.

17. The storage medium of claim 15, wherein said instructions also control said processor to perform actions of:
receiving a communication that serves as first delimiter;
receiving a quantity of data in one or more data packets;
receiving a communication that serves as a second delimiter; and
setting said target range based on said quantity of data in said one or more data packets.

18. The storage medium of claim 15, wherein said instructions also control said processor to perform actions of:
receiving a communication that includes information selected from the group consisting of (a) a target value for a quantity of data in said buffer, (b) a target range for a quantity of data in said buffer, and (c) a combination thereof; and setting said target range based on said information.

19. The storage medium of claim 15, wherein said upsampling factor is greater than said downsampling factor if said average quantity is below said target range, and wherein said upsampling factor is less than said downsampling factor if said average quantity is above said target range.

20. The storage medium of claim 15, wherein said data stream is a digital representation of an analog signal, and wherein said converting converts said first quantity of samples to said second quantity of samples without distorting said analog signal.

21. The storage medium of claim 15, wherein said buffer is a playback buffer in a receiver.

* * * * *